United States Patent
Oh et al.

(10) Patent No.: US 9,801,442 B2
(45) Date of Patent: Oct. 31, 2017

(54) POUCH AND PORTABLE ELECTRONIC DEVICE RECEIVED THEREIN

(71) Applicant: LG ELECTRONICS INC., Seoul (KR)

(72) Inventors: Jungin Oh, Seoul (KR); Sulyong Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/658,684

(22) Filed: Oct. 23, 2012

(65) Prior Publication Data

US 2013/0300679 A1    Nov. 14, 2013

(30) Foreign Application Priority Data

May 9, 2012    (KR) ........................ 10-2012-0049338

(51) Int. Cl.
| | |
|---|---|
| G06F 3/041 | (2006.01) |
| A45C 11/00 | (2006.01) |
| G06F 3/0488 | (2013.01) |
| G06F 1/16 | (2006.01) |
| G06F 3/0481 | (2013.01) |
| H04B 1/3888 | (2015.01) |

(Continued)

(52) U.S. Cl.
CPC ............ *A45C 11/00* (2013.01); *G06F 1/1626* (2013.01); *G06F 1/1677* (2013.01); *G06F 3/0412* (2013.01); *G06F 3/0481* (2013.01); *G06F 3/0488* (2013.01); *H04B 1/3888* (2013.01); *H04M 1/04* (2013.01); *H04M 1/72575* (2013.01); *A45C 2011/002* (2013.01); *G06F 3/041* (2013.01); *G06F 2200/1634* (2013.01)

(58) Field of Classification Search
CPC ......................................................... G06F 3/02
USPC ......................................................... 345/173
See application file for complete search history.

(56) References Cited

U.S. PATENT DOCUMENTS

| | | | |
|---|---|---|---|
| 5,542,105 A | * | 7/1996 | Finch ................... H04B 1/3877 455/351 |
| 5,644,516 A | | 7/1997 | Podwalny et al. |

(Continued)

FOREIGN PATENT DOCUMENTS

| | | |
|---|---|---|
| CN | 201332790 Y | 10/2009 |
| CN | 202035620 U | 11/2011 |

(Continued)

OTHER PUBLICATIONS

Miyamoto, "At last Japan sales start, iPad2+, iPhone4," Weekly ASCII, Japan, and ASCII Media, 831st Volume of the set, Apr. 25, 2011, pp. 20-23 (7 pages total).

*Primary Examiner* — Jennifer Mehmood
*Assistant Examiner* — Carl Adams
(74) *Attorney, Agent, or Firm* — Birch, Stewart, Kolasch & Birch, LLP

(57) ABSTRACT

A pouch for receiving a main body of a portable electronic device having a touch screen provided on a front surface thereof includes: a first part for receiving a rear surface of the main body; and a second part rotatably connected to the first part to close or open the touch screen, wherein the second part is formed to expose visual information of the touch screen to the outside in a state in which the touch screen is covered, and has conductivity allowing the touch screen to sense a touch input applied thereto in the closed state.

27 Claims, 15 Drawing Sheets

(51) Int. Cl.
*H04M 1/725* (2006.01)
*H04M 1/04* (2006.01)

(56) References Cited

U.S. PATENT DOCUMENTS

| | | | |
|---|---|---|---|
| 6,215,474 B1 | 4/2001 | Shah | |
| 7,907,394 B2 | 3/2011 | Richardson et al. | |
| 8,922,506 B2 | 12/2014 | Jung et al. | |
| 2003/0095110 A1 | 5/2003 | Ukita et al. | |
| 2004/0248621 A1 | 12/2004 | Schon | |
| 2007/0243911 A1 | 10/2007 | Saito | |
| 2008/0100916 A1* | 5/2008 | Suhl | H05B 33/12 359/601 |
| 2008/0165140 A1* | 7/2008 | Christie | G06F 3/04883 345/173 |
| 2009/0009945 A1 | 1/2009 | Johnson et al. | |
| 2009/0104441 A1* | 4/2009 | Sawada | B29C 45/14811 428/337 |
| 2009/0184884 A1* | 7/2009 | Kyou | G06F 1/1626 343/901 |
| 2010/0096284 A1* | 4/2010 | Bau | B65D 85/00 206/320 |
| 2010/0200456 A1* | 8/2010 | Parkinson | B29C 33/485 206/701 |
| 2010/0238119 A1 | 9/2010 | Dubrovsky et al. | |
| 2010/0299598 A1* | 11/2010 | Shin | G06F 3/0488 715/702 |
| 2011/0074733 A1* | 3/2011 | Makinen | G09B 21/004 345/174 |
| 2011/0284420 A1* | 11/2011 | Sajid | G06F 1/1628 206/576 |
| 2011/0309728 A1* | 12/2011 | Diebel | H04B 1/3888 312/293.1 |
| 2012/0037285 A1 | 2/2012 | Diebel et al. | |
| 2012/0081292 A1* | 4/2012 | Sirpal | G06F 1/1616 345/169 |
| 2012/0133484 A1* | 5/2012 | Griffin | G06F 21/51 340/5.54 |
| 2012/0154301 A1* | 6/2012 | Kang | G06F 3/04886 345/173 |
| 2012/0211377 A1* | 8/2012 | Sajid | G06F 1/1628 206/216 |
| 2012/0250270 A1* | 10/2012 | Liu | H04M 1/185 361/752 |
| 2012/0302297 A1* | 11/2012 | Patel | H04M 1/0283 455/575.4 |
| 2013/0088431 A1* | 4/2013 | Ballagas | G06F 1/1626 345/168 |

FOREIGN PATENT DOCUMENTS

| | | |
|---|---|---|
| EP | 1852254 A1 | 11/2007 |
| JP | 9-262115 A | 10/1997 |
| JP | 2004-145893 A | 5/2004 |
| JP | 2006-191387 A | 7/2006 |
| JP | 2011-180964 A | 9/2011 |
| KR | 10-0942340 B1 | 2/2010 |
| KR | 10-2010-0084941 A | 7/2010 |
| KR | 10-2010-0130345 A | 12/2010 |
| KR | 20-2011-0006035 U | 6/2011 |
| WO | WO 97/35263 A1 | 9/1997 |

\* cited by examiner

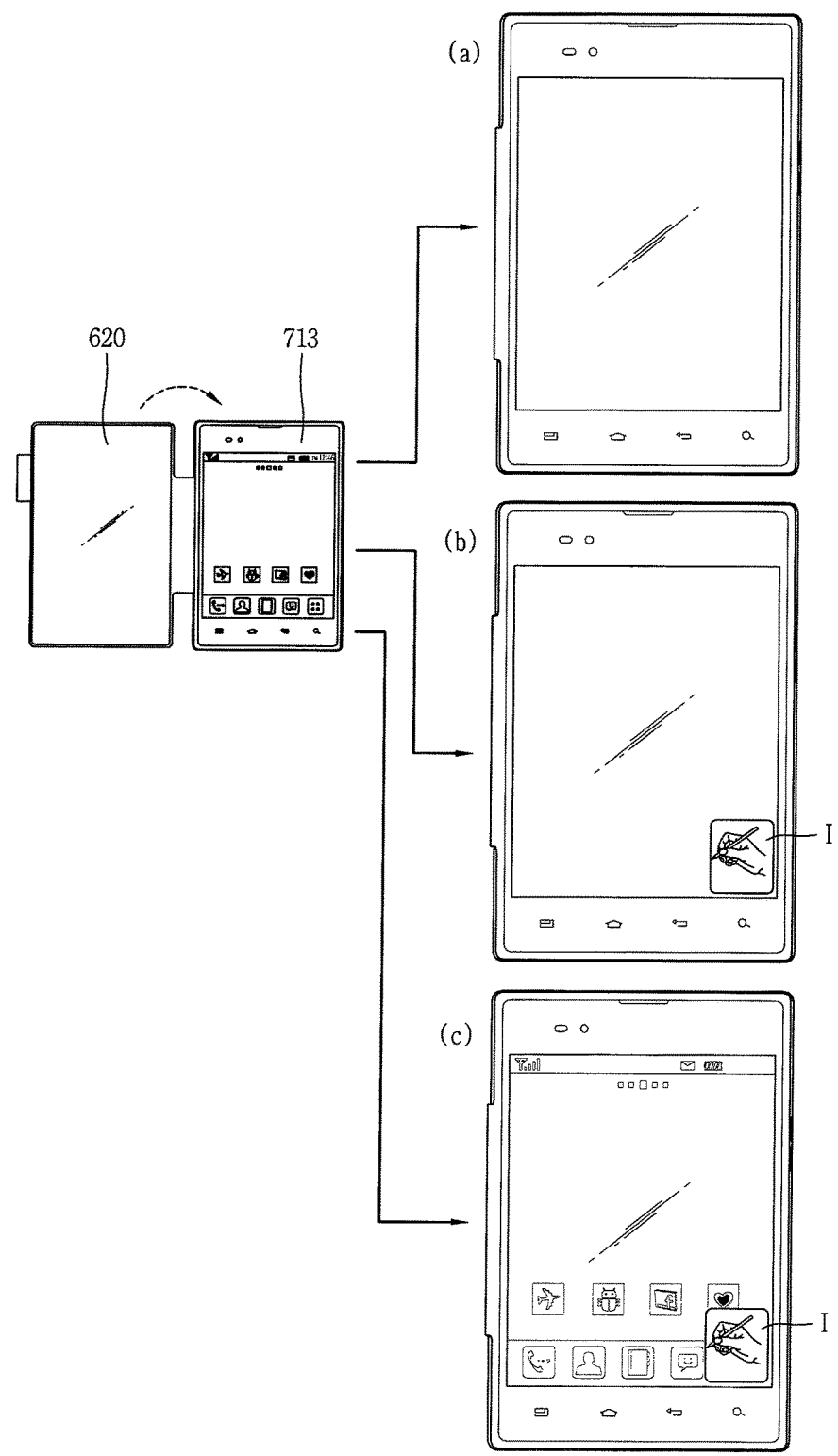

POUCH AND PORTABLE ELECTRONIC DEVICE RECEIVED THEREIN

CROSS-REFERENCE TO RELATED APPLICATIONS

The present application claims priority to Korean Application No. 10-2012-0049338 filed in Korea on May 9, 2012, the entire contents of which is hereby incorporated by reference in its entirety.

BACKGROUND OF THE INVENTION

Field of the Invention

The present invention relates to a pouch for receiving or accommodating a portable electronic device therein and a portable electronic device having a relevant function.

Description of Related Art

A portable electronic device is a device that can be carried around and has one or more functions such as voice and video call communication, inputting and outputting information, storing data, and the like.

As such functions has become diversified, a portable electronic device is implemented in the form of a multimedia player supporting more complicated functions such as capturing images or video, reproducing or playing music or video files, playing games, receiving broadcast signals, and the like.

In order to implement various functions of multimedia players or devices, various attempts have been newly applied in terms of hardware or software. For example, a user interface allowing users to easily and conveniently search for and select one or more functions is provided.

Also, recently, in order to protect a portable electronic device, development of a pouch for receiving or accommodating a portable electronic device therein to protect it has been actively ongoing. However, with a portable electronic device received in a pouch, there is a limitation in using the portable electronic device. As such limitations, for example, first, with a touch screen of the portable electronic device covered by the pouch, the user cannot view output visual information without opening the pouch. Second, when a portion of the pouch corresponding to the touch screen is cut out as a solution thereto, its design is shoddy and cannot properly protect the touch screen. Third, with the touch screen covered by the pouch, when external force is applied to the pouch in a forward direction, the pouch is distorted.

Thus, a pouch that may allow for a touch input with respect to a touch screen of a portable electronic device even in a state in which the touch screen is covered by the pouch may be considered, and in addition, a portable electronic device that may implement a user interface in relation to such a state may also be considered.

BRIEF SUMMARY OF THE INVENTION

An object of the present invention is to provide a pouch implementing a novel form factor of a portable electronic device in combination with the portable electronic device.

Another object of the present invention is to provide a portable electronic device available for a touch input without having to open a pouch accommodating the portable electronic device therein, and a pouch.

Another object of the present invention is to provide a novel mechanism providing a change in a design or an additional function to a portable electronic device.

To achieve these and other advantages and in accordance with the purpose of the present invention, as embodied and broadly described herein, the present invention provides in one aspect a pouch for receiving a main body of a portable electronic device having a touch screen provided on a front surface thereof, including: a first part for receiving a rear surface of the main body; and a second part rotatably connected to the first part to close or open the touch screen, wherein the second part is formed to expose visual information of the touch screen to the outside in a state in which the touch screen is covered (or closed), and has conductivity allowing the touch screen to sense a touch input applied thereto in the closed state.

In an embodiment related to the present invention, the second part may be made of a rubber material so as to be tightly attached to the touch screen in the closed state, and the first part may be made of a material harder than the rubber material.

In another embodiment related to the present invention, the second part may have ductility higher than that of the first part so as to be easily deformed.

In another embodiment related to the present invention, a touch key may be disposed on a front surface of the main body such that it is adjacent to the touch screen, and the second part may include: a first region corresponding to the touch screen; and a second region corresponding to the touch key and formed to have sensitivity with respect to a touch higher than that of the first region.

In another embodiment related to the present invention, a film may be mounted on the second portion to provide an extra function to the second part.

In another embodiment related to the present invention, a recess portion may be formed on one surface of the second part, and the film may be accommodated in the recess portion.

In another embodiment related to the present invention, a magnet may be mounted on the second part to allow the main body to recognize the closed state and adjust brightness of the touch screen, and a sensor corresponding to the magnet may be mounted on the main body.

In another embodiment related to the present invention, the second part may include a base portion made of a light-transmissive material; and a soft layer formed on one surface of the base portion and formed to be softer (or more ductile) than the base portion in order to enhance tightness (nearness or closeness) with the touch screen.

In another embodiment related to the present invention, the pouch may include a connection portion formed to connect the first and second parts and made of the same material as that of the second part.

In another embodiment related to the present invention, an audio output hole may be provided on a front surface of the main body, and a sloped portion may be foamed on an end portion of the second part to form a gap between the audio output hole and the second part.

To achieve these and other advantages and in accordance with the purpose of the present invention, as embodied and broadly described herein, the present invention provides in another aspect a portable electronic device including a terminal main body having a front surface and a rear surface and formed to be accommodated in a pouch; and a touch screen disposed on the front surface of the terminal main body, wherein the pouch includes a first part on which a rear surface of the main body of the portable electronic device is disposed; and a second part rotatably connected to the first part so as to close or open the touch screen and formed to be light-transmissive to expose visual information of the touch screen to the outside in a state in which the touch screen is covered (or closed), wherein the main body senses opening and closing of the touch screen by the second part.

In another embodiment related to the present invention, the second part may be made of a rubber material to allow the touch screen to sense a touch input in the closed state.

In another embodiment related to the present invention, when the touch screen is activated in a state in which the second part covers (or closes) the touch screen, the main body may increase brightness of the touch screen in comparison to pre-set brightness of the touch screen.

In another embodiment related to the present invention, defining of inputting to release a lock mode of the touch screen may be set in relation to opening and closing of the touch screen by the second part.

In another embodiment related to the present invention, a graphic user interface (GUI) output to the touch screen to correspond to an input of a control command may be set to be different according to opening and closing of the touch screen by the second part.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 10(a) and 10 (b) are conceptual views illustrating examples of graphic user interfaces implemented by a portable electronic device according to an embodiment of the present invention;

FIGS. 14(a), 14(b) and 14(c) are conceptual views illustrating examples of graphic user interfaces implemented by a portable electronic device according to an embodiment of the present invention.

DETAILED DESCRIPTION OF THE INVENTION

A portable electronic device in relation to embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

In the present disclosure, like numbers refer to like elements throughout although the embodiments are different, and a description of the like elements a first embodiment will be used for those of the different embodiment. As used herein, the singular forms "a", "an" and "the" are intended to include the plural forms as well, unless the context clearly indicates otherwise.

Portable electronic devices described in the present disclosure may include laptop computers, digital broadcast terminals, PDAs (Personal Digital Assistants), PMPs (Portable Multimedia Player), navigation devices, and the like, as well as mobile terminals such as tablet PCs, mobile phones, smart phones.

Figure 1:
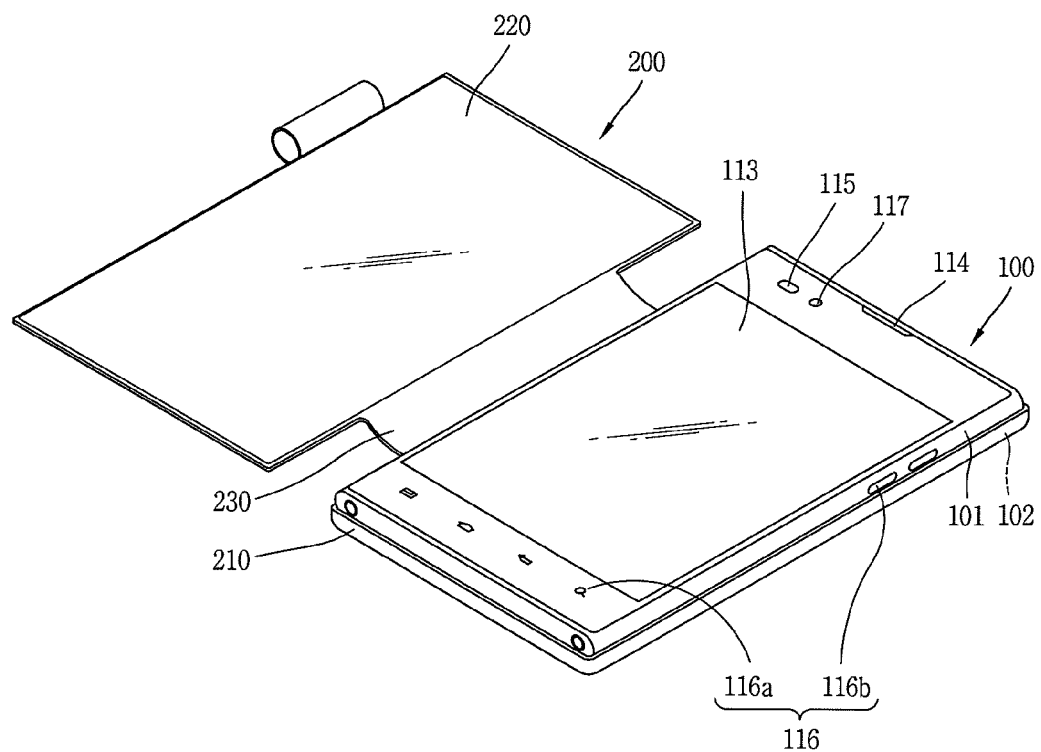
FIG. 1 is a perspective view illustrating a portable electronic device received (or accommodated) in a pouch according to an embodiment of the present invention.

FIG. 1 is a perspective view illustrating a portable electronic device received (or accommodated) in a pouch according to an embodiment of the present invention. In FIG. 1 a mobile terminal is illustrated as an example of a portable electronic device.

A mobile terminal in relation to an embodiment of the present invention is not limited to a bar type mobile terminal and may be applicable to various other structures such as a slide type mobile terminal, a folder type mobile terminal, a switching type mobile terminal, and the like.

A case (or casing, housing, cover, etc.) constituting an external appearance of a main body (referred to as a 'body', hereinafter) of a portable electronic device 100 includes a front case 101 and a rear case 102. Various electronic components are installed in the space between the front case 101 and the rear case 102. At least one intermediate case may be additionally disposed between the front case 101 and the rear case 102. The cases may be formed by injectionmolding a synthetic resin or may be made of a metallic material such as stainless steel (STS) or titanium (Ti), etc.

A display unit 113, an audio output module 114, a camera 115, a user input unit 116, a microphone (not shown) may be disposed on the front case 101.

The display unit 113 occupies the majority of a main surface (front surface) of the portable electronic device 100. The display unit 113, which serves to display visual information or image information, may include at least one of a Liquid Crystal Display (LCD), a Thin Film Transistor-LCD (TFT-LCD), an Organic Light Emitting Diode (OLED) display, a flexible display, and a three-dimensional (3D) display. The display unit 113 may include a touch pad allowing for an input of information through a user's touch, and in this case, the display unit 113 may serve as a touch screen (the display unit is referred to as the 'touch screen', hereinafter).

Icons of function keys may be output as virtual keys in a state of being input in a tactile manner to an exposed portion of a touch screen. For example, when a video is output to the touch screen 113, functions keys may be configured to receive commands for implementing functions such as pause, play, rewind, fast forward, play list, and the like.

Various types of visual information may be displayed on the touch screen 113. These information may be displayed in the form of character, number, symbol, graphic, icon, and the like.

In order to input the information, at least one of the character, number, symbol, graphic and icon is displayed in a certain array so as to be implemented in the form of a keypad. Such a keypad may be so-called 'a virtual key board'.

The touch screen 113 may be operated as a whole region or may be divided into a plurality of regions and accordingly operated. In the latter case, the plurality of parts may be operated in association with each other. As illustrated a bezel unit is provided on edges of the touch screen 113 to support the edges.

An audio output unit 114 is disposed between the touch screen 113 and the bezel unit. The audio output unit 114 may be implemented in the for in of a receiver or a speaker.

The camera 115 is disposed on a region adjacent to one of both end portions of the touch screen 113. The camera 115 may be installed in the portable electronic device 100 such that it can be rotated or popped up.

The user input unit 116 is manipulated to receive a command for controlling the operation of the portable electronic device 100 and may include a plurality of manipulation units. The manipulation units may also be generally referred to as a manipulating portion, and various methods and techniques may be employed for the manipulation portion so long as they can be operated by the user in a tactile manner.

For example, the manipulation unit may be implemented as a dome switch, a touch screen, or a touch pad that may be able to receive a command or information according to a user push or touch manipulation, or may be implemented in a manipulative manner such as a wheel, a jog, a joystick.

As an example of the user input unit 116, a touch key 116a may be disposed on a lower portion of the touch screen 113. As another example of the user input unit, a push key 116b may be disposed on a lateral surface of the portable electronic device 100.

The push key 116b is preferably disposed on the lateral surface not covered by an extending module in teams of manipulation convenience (See FIG. 2B). The touch key 116a and the push key 116b may be generally called a manipulating portion.

In a functional aspect, the touch key 116a may be operated as a menu key for inputting menus such as start, end, OK, or the like, and the push key 116b may be operated as a hot key for performing a special function such as activation of the camera 115, activation of the touch screen 113, and the like, in addition to a scroll function and a volume adjustment function.

Also, an interface (not shown) may be provided on a lateral surface opposite to the lateral surface on which the push key 116b is disposed. The interface may serve as a passage allowing the portable electronic device 100 to exchange data with an external device. For example, the interface may be at least one of a connection port to be connected with an earphone through a fixed line or wirelessly, a port for short range communication (e.g., an IrDA port, a Bluetooth port, a wireless LAN port, or the like), and a power supply port for supplying power to the portable electronic device 100. The interface may be a card socket for receiving/accommodating an external card such as a Subscriber Identification Module (SIM), a User Identity Module (UIM), a memory card for storing information, or the like.

Referring to FIG. 1, the body of the portable electronic device 100 may include a microphone. The microphone may be disposed on a region adjacent to an end portion different from the end portion on which the camera 115 is disposed on the touch screen. Also, an illumination sensor, a proximity sensor 117, and the like, may be mounted on the body.

As illustrated, the pouch 200 is configured to receive or accommodate the body of the portable electronic device 100. In FIG. 1, it is illustrated that the touch screen 113 is open by the pouch 200.

The pouch 200 includes a first part 210 and a second part 220. In detail, the first part 210 is configured to receive a rear surface of the body and the second part 220 may be rotatably connected to the first part 210 such that the second part 220 closes or opens the touch screen.

When at least a portion of the first and second parts 210 and 220 are made of a material, e.g., leather, or the like, different from that of the portable electronic device 100, it may provide a fresh sensation in comparison to a case of using only the portable electronic device 100.

A connection portion 230 connecting the first and second parts 210 and 220 may extend in a protruded manner from the edges of the second part 220. The connection portion 230 may be made of the same material as that of the second part 220. The connection portion 230 may have a narrow width so as to be easily bent, and the second part 220 may be rotated to close the touch screen through the connection portion 230.

Figure 2:
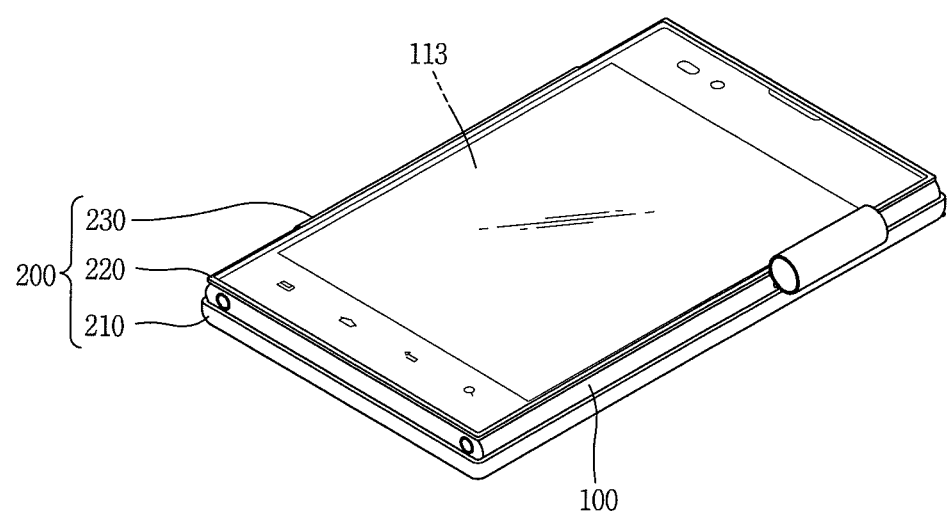
FIG. 2 is a perspective view illustrating a state in which the pouch of FIG. 1 covers a touch screen of the portable electronic device.
Figure 3:
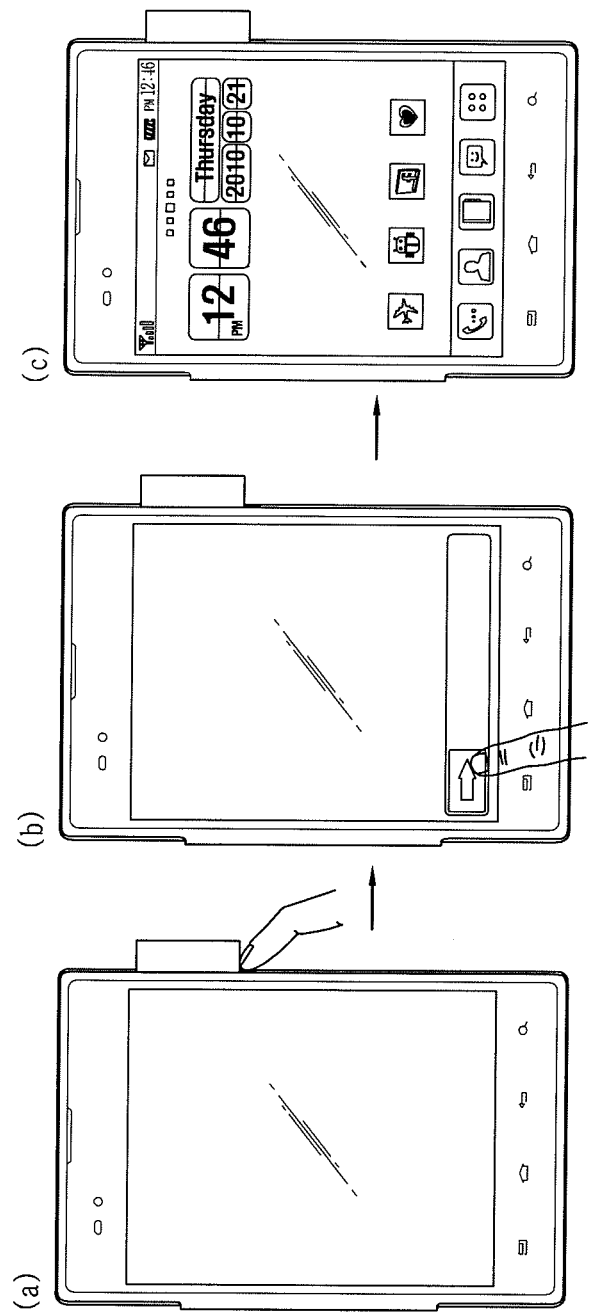
FIGS. 3(a), 3(b), and 3(c) are conceptual views illustrating operational examples of the portable electronic device in the covered state of FIG. 2.

FIG. 2 is a perspective view illustrating a state in which the pouch of FIG. 1 covers (or closes) a touch screen of the portable electronic device, and FIGS. 3A, 3B, and 3C are conceptual views illustrating operational examples of the portable electronic device in the covered state of FIG. 2.

Referring to FIGS. 2, 3A, and 3B, the second part 220 is rotated based on the connection portion 230 to change an open state (See FIG. 1) in which the touch screen 113 is open, to a state in which the touch screen 113 is covered (or closed).

In the closed state, the portable electronic device 100 and the pouch 200 have a shape of diary, enhancing user portability. Also, since the pouch 200 serves as a protection cover covering the portable electronic device 100, the portable electronic device 100 can be safely protected from external impact or stimulus.

The first and second parts 210 and 220 may be disposed to be parallel in the covered state, and the connection portion 230 may be formed to block only a portion of a gap formed between the first and second parts 210 and 220. Accordingly, a portion of the lateral surface of the portable electronic device 100 may be exposed in the covered state, and an interface, or the like, may be disposed on the exposed portion.

Referring to FIGS. 3A to 3C, the second part 220 of the pouch 200 is formed to expose visual information of the touch screen 113 in a state of closing the touch screen 113, and has conductivity to allow the touch screen 113 to sense a touch input.

For example, in case in which the portable electronic device 100 is in a sleep mode in the covered state, when the push key is pressed (See FIG. 3A), the portable electronic device 100 wakes up and a lock screen is output to the touch screen (See FIG. 3B).

In the present embodiment, a state of the portable electronic device 100 is divided into a 'locked state', and an 'unlocked state' depending on whether or not a control command of the user is allowed to be input.

First, the locked state is a state in which an input of a control command of the user with respect to applications included in the portable electronic device 100 is limited. This is to mainly prevent functions and applications of the portable electronic device 100 from being activated or deactivated according to a control command not intended by the user in the portable electronic device 100 available for a touch input. Thus, in the locked state, inputting of a control command of the user input through the touch screen 113 and other user input unit 116 (See FIG. 1) is limited within a pre-set range.

Here, the locked state may be executed when a user input is not sensed during a pre-set period of time with respect to the portable electronic device 100. The pre-set time may be changed according to a user setting.

Also, the locked state may be executed when the user presses a special key (e.g., a hold key) provided on the portable electronic device 100 previously set for the locked state. Namely, in the present embodiment, the special key is the push key 116b.

In the locked state, for example, a lock screen may be output to the touch screen. The lock screen may be a screen to which a particular icon for unlocking may be output, and the unlocked state may be executed by applying a touch input to a particular icon on the lock screen. However, the present invention is not necessarily limited thereto and the user may press the particular key again to release the locked state, or the like. Namely, unlocking may be executed by a pre-set manipulation applied to the portable electronic device 100.

Referring to FIG. 3B, the lock screen of the touch screen 113 is output to the outside through the second part 220 of the pouch 200. To this end, the second part 220 may be light-transmissive (or transparent). Also, referring to FIGS. 3B and 3C, when the second part 220 of the pouch is touched to apply a touch input with respect to the lock screen, the touch screen senses it and the portable electronic device 100 executes a control command corresponding to the touch input. In the present embodiment, the control command is unlocking.

In this manner, in an embodiment of the present invention, with the portable electronic device 100 covered by the pouch, the user can manipulate the touch screen. Hereinafter, structures of the pouch allowing for a novel design and operation and the portable electronic device 100 will be described in detail.

Figure 4:
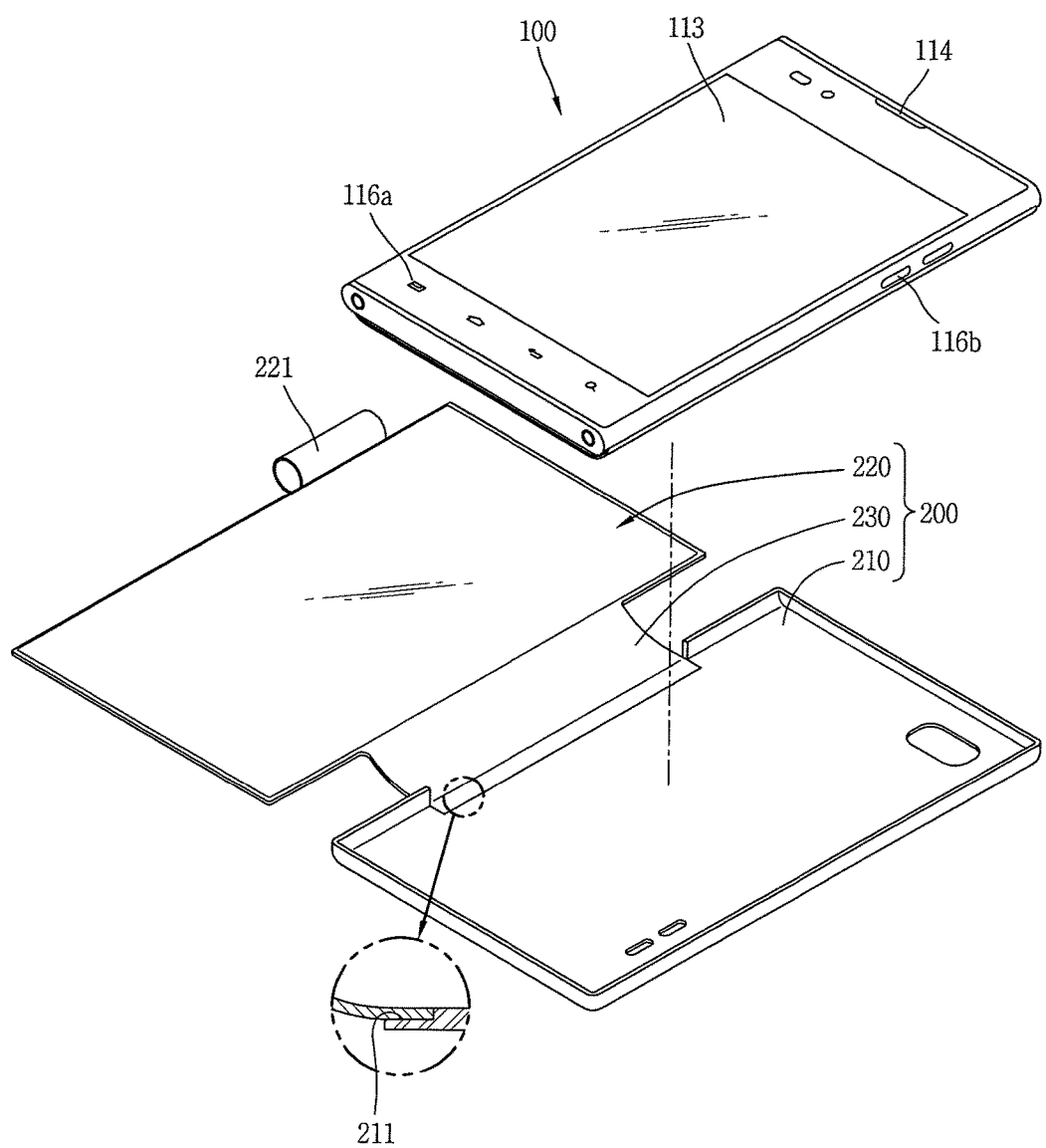
FIG. 4 is an exploded perspective view illustrating a detailed configuration of the pouch and the portable electronic device according to an embodiment of the present invention.
Figure 5:
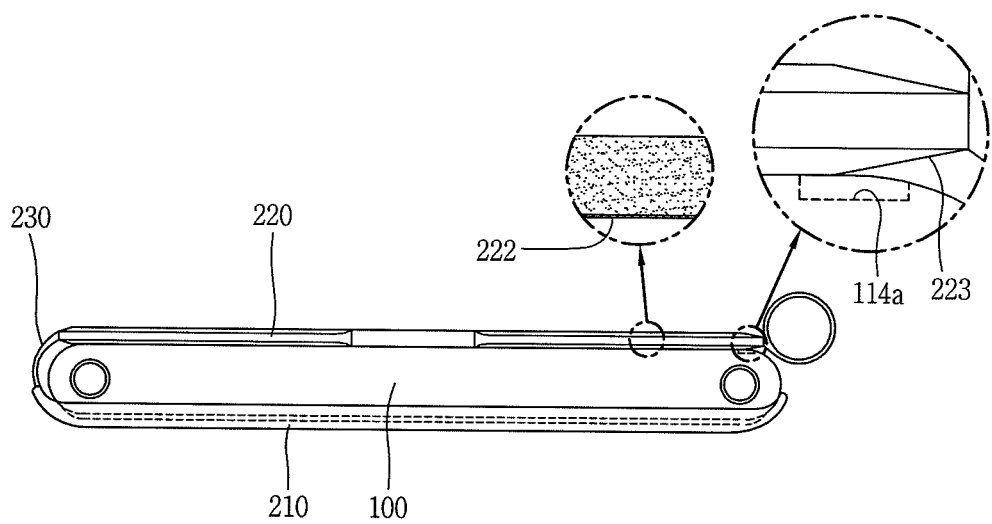
FIG. 5 is a sectional view showing the covered state of the pouch of FIG. 2.

FIG. 4 is an exploded perspective view illustrating a detailed configuration of the pouch and the portable electronic device according to an embodiment of the present invention, and FIG. 5 is a sectional view showing the covered state of the pouch of FIG. 2.

As illustrated, both the first and second parts 210 and 220 of the pouch 200 are disposed to be parallel to the portable electronic device 100.

The first part 210 has a configuration allowing the body of the portable electronic device 100 to be fit therein. As an example of the configuration, edges of the first part 210 may be protruded from a main surface of the first part 210.

Referring to FIG. 4, the connection portion 230 is protruded from one side of the second part 220, and an accommodation recess 211 is formed on one surface of the first part 210 to accommodate the connection portion 230. An end portion of the connection portion 230 may be attached to the accommodation recess 211. Through this structure, the connection portion 230 can be easily coupled and a thinner structure can be obtained.

Also, an annular pen mounting unit 221 is provided on the other side of the second part 220. Pen may be a stylus used for a touch input. The pen mounting unit 221 is protruded from a main surface of the second part 220 and is made of the same material, namely, a rubber material. Accordingly, even when the second part 220 collides with an external object, the second part 220 is not scratched.

Referring to FIG. 5, the second part 220 is tightly attached to the touch screen in a closed state, and to this end, the second part 220 is made of a material softer than that of the first part 210. For example, hardness thereof may be 70 to 90 degree.

Also, the second part 220 may have higher level of ductility than that of the first part 210 so as to be easily deformed. For example, the second part 220 is made of a rubber material. Since the second part 220 is tightly attached to the touch screen 113, sensitivity of the touch screen 113 with respect to a touch sense can be maintained. Also, the rubber material has kind of conductivity, so the touch screen 113 is able to sense a touch input in a state in which the second part covers the touch screen 113.

In addition, the second part 220 has light transmittance to allow the touch screen 113 to be exposed to the outside, and is made of a material having conductivity to allow for a touch input. For example, the second part 220 may be made of a urethane or silicon material having light transmittance.

Also, the first part 210 may be made of a material, e.g., a synthetic resin, harder than a rubber material. Also, the second part 220 may be formed to be thinker than the first part 210.

In addition, in order to increase frictional force with the body (specifically, the front surface) of the portable electronic device 100 in the closed state, one surface of the rubber material may be surface-treated. For example, an inner surface of the second part 220 may be gloss-finished. Accordingly, the inner surface of the second part 220 may have a surface-treated layer 222 formed thereon, and the second part 220 can be prevented from sliding in a direction parallel to the front surface of the portable electronic device 100.

A bezel portion supporting edges of the touch screen 113 is formed to be very thin, and an audio output hole 114a is formed on an end portion of the touch screen (specifically, the window). A sloped portion 223 is fainted on an end portion of the second part 220 of the pouch such that a gap is formed between the audio output hole 114a and the second part 220. Since the second part 220 is tightly attached to the front surface of the portable electronic device 100, a sound can be discharged to the outside even in the covered state.

Also, the sloped portion 223 may be formed on corners of the front surface and the rear surface of the second part 220, respectively. Accordingly, the user can easily grasp the second part 220 in order to open the second part 220 tightly attached to the touch screen 113.

As illustrated, in order to lower transparency, pigment may be contained in the rubber material. Accordingly, the second part 220 may have translucency allowing the user to easily recognize the touch screen 113 only when the touch screen 113 is activated.

Also, the pigment may include a conductive material to enhance conductivity of the second part 220. Due to the conductive material, a touch recognition rate of the touch screen can be further enhanced.

The pouch and the portable electronic device 100 as described above may be variably modified. Hereinafter, another embodiment of the present invention will be described, and the same content as that of the embodiment described above with reference to FIGS. 1 to 5 will be replaced by the foregoing content.

Figure 6A:
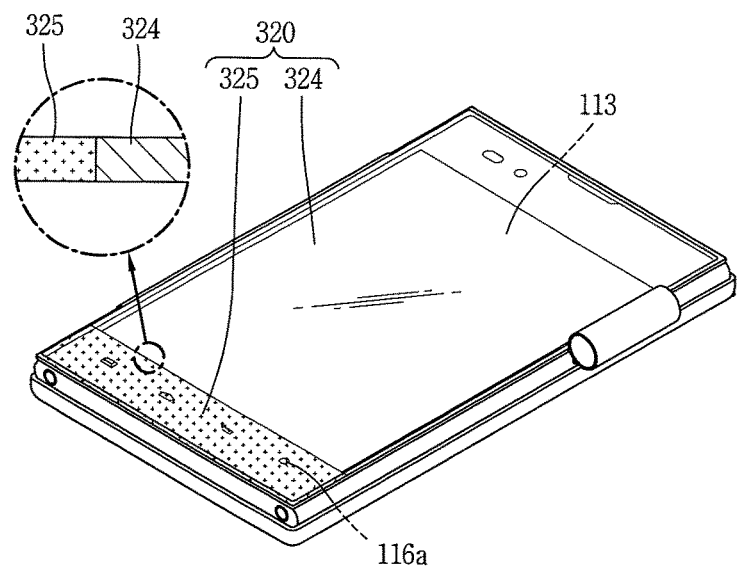
FIGS. 6A and 6B are conceptual views illustrating a pouch according to another embodiment of the present invention.
Figure 6B:
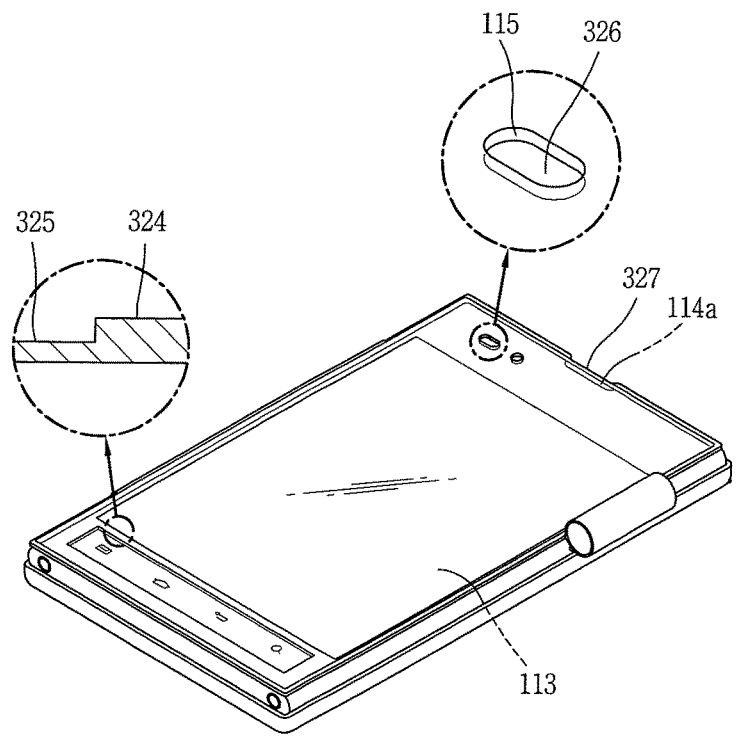

FIGS. 6A and 6B are conceptual views illustrating a pouch according to another embodiment of the present invention;

As illustrated, a second part 320 of the pouch is divided into first and second regions 324 and 325. In detail, the first region 324 may be a region corresponding to the touch screen 113, and the second region 325 may be a region corresponding to the touch key 116a.

The first and second regions 324 and 325 may be configured to have a different level of touch sensitivity, respectively. For example, with respect to a touch, the second region 325 may be formed to have higher level of sensitivity than that of the first region 324.

The touch key 116a of the portable electronic device 100 senses only a touch applied to a portion corresponding to the key, so it may be configured to have a relatively lower level of sensitivity with respect to touch sensing in comparison to the touch screen 113. For example, density of a touch pattern in the touch screen is higher. Since the second region 325 is easily conducted, the low level of sensitivity (or weak sensitivity) of the touch key 116 can be compensated.

For example, referring to FIG. 6A, the first and second regions 324 and 325 may be made of different materials. For example, the first region 324 may be made of a synthetic resin (e.g., transparent PC), while the second region 325 may be made of a silicon material.

In another example, the material of the second part is the same, but pigment having a different size of conductivity may be contained in the first and second regions 324 and 325. In detail, pigment may have different conductivity by color. Thus, by differentiating color, sensitivity of the touch key 116a may be compensated as well as implementing a unique design.

In another example, the second part may be made of the same material, while the same pigment may be included in the first and second regions 324 and 325 but the first and second regions 324 and 325 may have different content of the same pigment, respectively. In detail, when the content of pigment is increased, opacity is increased, and accordingly, a pouch having different transparency by regions can be implemented.

Referring to FIG. 6B, the first and second regions 324 and 325 may have a different thickness, respectively. For example, the second region 325 may be formed to be thinner than the first region 325. To this end, the second region 325 may be formed to be recessed in the front surface of the second part. Also, a camera hole 326 may be provided to be recessed from the front surface of the second part. Also, a camera hole 326 may be provided on a front surface of the second part 320. The camera hole 326 may be formed on the front surface of the second part 320. The camera hole 326 may be formed at a position corresponding to the camera 115 of the portable electronic device 100.

As illustrated, a recess 327 corresponding to the audio output hole 114a may be formed on an end portion of the second part. A sound is discharged through the recess 327, so the recess 327 serves to facilitate a call in the closed state.

Figure 7:
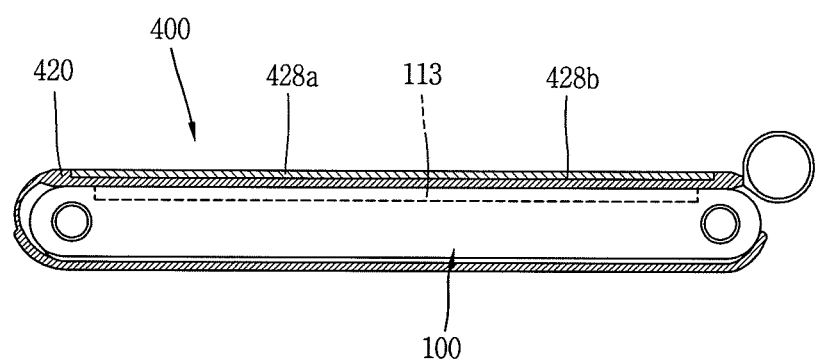
FIG. 7 is a sectional view of a pouch according to another embodiment of the present invention.

FIG. 7 is a sectional view of a pouch according to another embodiment of the present invention.

As illustrated, a film 428a is mounted on a second part 420 of a pouch 400 to provide an extra function to the second part 420.

The film 428a may be a mirror film that reflects light when the touch screen 113 is deactivated, or an information security film that limits a viewing angle with respect to the touch screen 113.

In detail, a recess portion 428b is footed on one surface of the second part 420, and the film 428a is accommodated in the recess portion 428b. When the film 428a is a mirror film, one surface of the second part 420 may be the opposite surface of the surface facing the touch screen 113 in the closed state. The mirror film may be integrated with the second part 420 through insert injection. Thus, a recess portion may be formed on an outer surface (front surface) of the second part 420 and the mirror film may be disposed therein.

When the film 428a is an information security film, the surface of the second part 420 on which a recess portion is formed may be a surface that faces the touch screen 113 in the closed state. The information security film has a low melting point, so it is not available for insert injection. Thus, a recess portion is formed on an inner surface (rear surface) of the second part and the information security film is attached thereto. However, the present invention is not limited thereto and the information security film may be mounted on an outer surface of the second part according to a fabrication process or the use of a new material.

Figure 8:
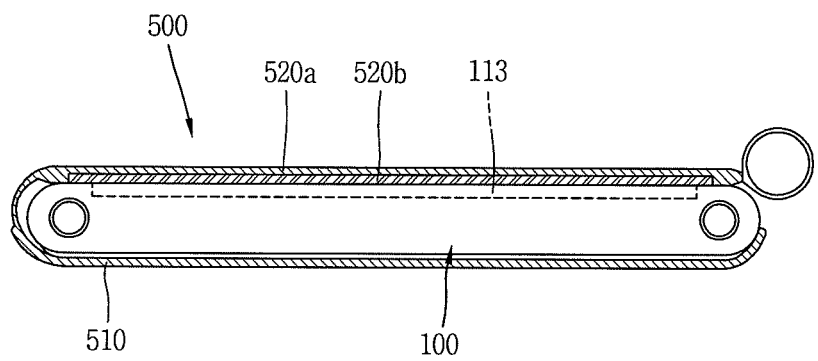
FIG. 8 is a sectional view of a pouch according to another embodiment of the present invention.

FIG. 8 is a sectional view of a pouch according to another embodiment of the present invention.

As illustrated, a second part 520 of a pouch 500 includes a base portion 520a and a soft layer 520b.

The base portion 520a is made of a light-transmissive synthetic resin, e.g., transparent PC or transparent acryl. In this case, a first part 510 may be made of the same material as that of the base portion 520a. However, the first part 510 may be made of a different material such as an opaque material, or the like.

The soft layer 520b is formed on one surface of the base portion 520a. In order to increase tightness with the touch screen 113, the soft layer 520b is formed to be softer than the base portion 520a. For example, the soft layer 520b is formed on an inner surface (rear surface) of the base portion 520a. The soft layer 520b refers to a portion that a rubber material is integrated with the base portion 520a through insert injection (or in-mold injection), and helps to increase tightness between the second part 520 and the touch screen 113.

Figure 9:
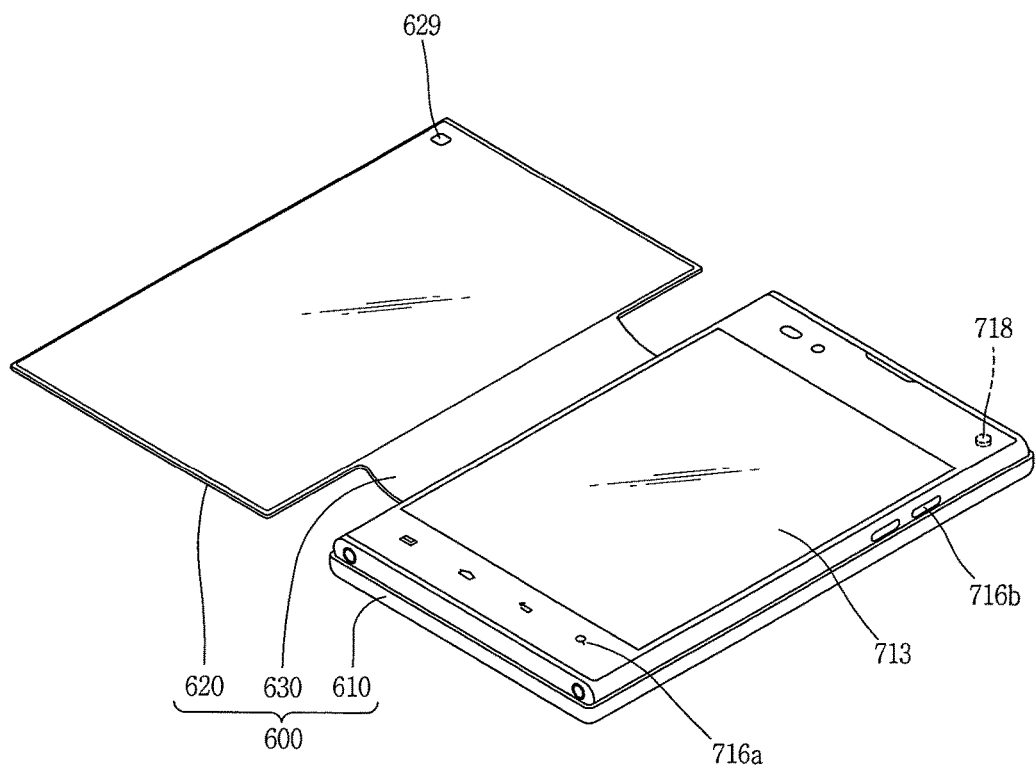
FIG. 9 is a perspective view of a pouch and a portable electronic device according to another embodiment of the present invention.

FIG. 9 is a perspective view of a pouch and a portable electronic device according to another embodiment of the present invention.

Referring to FIG. 9, the portable electronic device body is configured to sense opening and closing of a touch screen 713 by a second part 620 of a pouch 600.

For example, a magnet 629 is mounted on the second part 620 to recognize the body closed state and control an operation using the same, and a sensor 718 corresponding to the magnet 629 is mounted on the body. The sensor 718 may be, for example, a hole IC for sensing a magnetic field.

However, the present invention is not necessarily limited thereto. For example, covering of the second part 620 may be recognized by using the proximity sensor 117 or an illumination sensor. Also, as illustrated, the pouch may be configured without a pen mounting unit, and this may be applied in the same manner to the former embodiment.

The portable electronic device may provide novel user interfaces using opening and closing a touch screen 713 to users. Such user interfaces will be described in detail.

Figure 10:
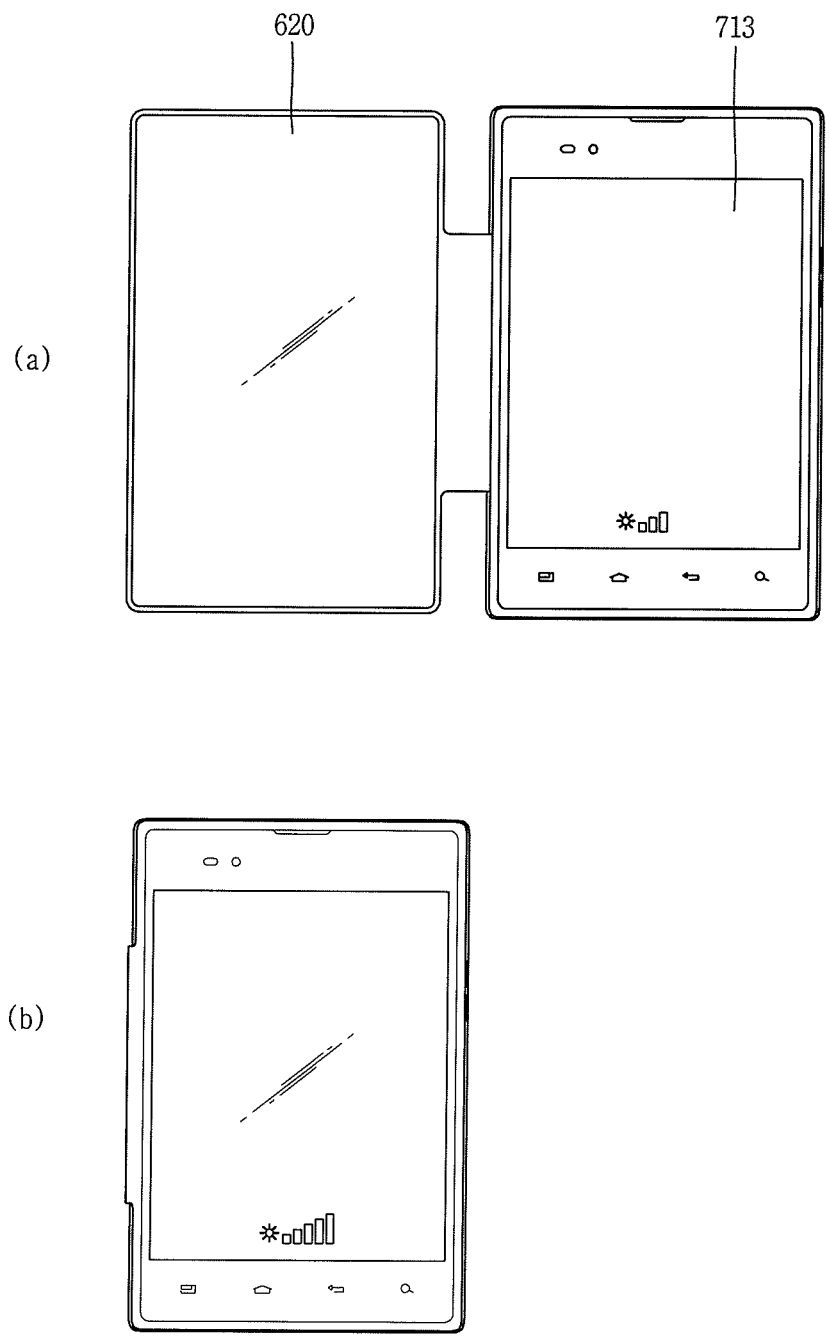

FIG. 10 is a conceptual view showing an example of a graphic user interface implemented by the portable electronic device according to an embodiment of the present invention.

As illustrated, the portable electronic device may be formed to adjust brightness of the touch screen 713 by using opening and closing of the touch screen 713.

In detail, the portable electronic device may be controlled to increase pre-set brightness of the touch screen 713 more than the pre-set brightness when the touch screen 713 is activated in the covered state.

For example, brightness of the touch screen 713 is set by the user when the portable electronic device 100 is used alone. A set value is applied as it is when the touch screen received in the pouch is open (FIG. 10(a)), and a value higher than the pre-set value is applied when the touch screen is covered (FIG. 10(b)) so that the touch screen can be easily recognized in the closed state. In this case, a degree of increasing brightness may be controlled in conjunction with an illumination value sensed by an illumination sensor.

Figure 11:
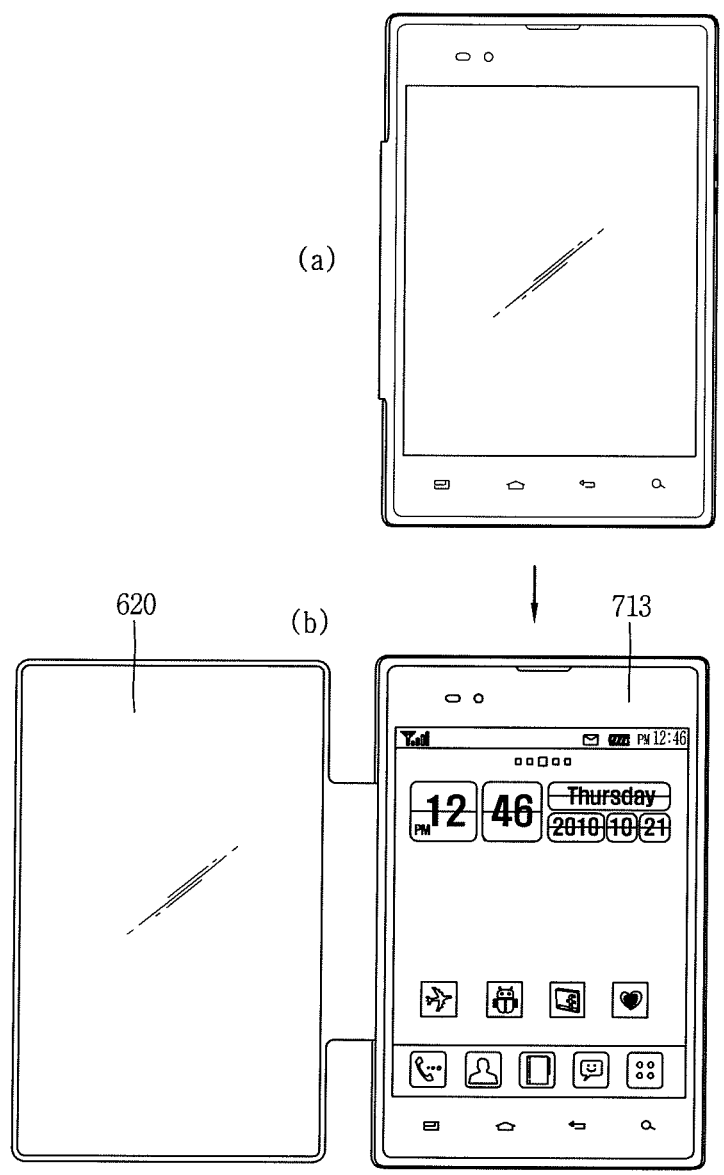
FIGS. 11(a) and 11(b) are conceptual views illustrating examples of graphic user interfaces implemented by a portable electronic device according to an embodiment of the present invention.

FIG. 11 is a conceptual view illustrating another example of a graphic user interface implemented by the portable electronic device according to an embodiment of the present invention.

As illustrated, defining of inputting to release a lock mode of the touch screen 713 may be set in relation to opening and closing of the touch screen 713 by the second part 620. Defining of inputting to release the lock mode may also include omitting of the lock mode.

For example, the portable electronic device may immediately enter a home screen according to opening and closing of the touch screen 713 in a sleep mode without converting into a lock screen.

Here, 'home screen' refers to a standby screen (or an idle screen) displayed in an unlocked state (as the locked state is released), namely, a screen on which icons or widgets of applications installed on the terminal are displayed. Also, a plurality of home screens may exist according to a user setting.

As shown in (a) of FIG. 11, a sleep mode refers to a state in which the touch screen of the portable electronic device is deactivated and inputting of a control command is locked. In the sleep mode, when the second part 620 is rotated in a direction to open the touch screen, the portable electronic device senses it and enters a home screen as shown in (b) of FIG. 11.

Figure 12:
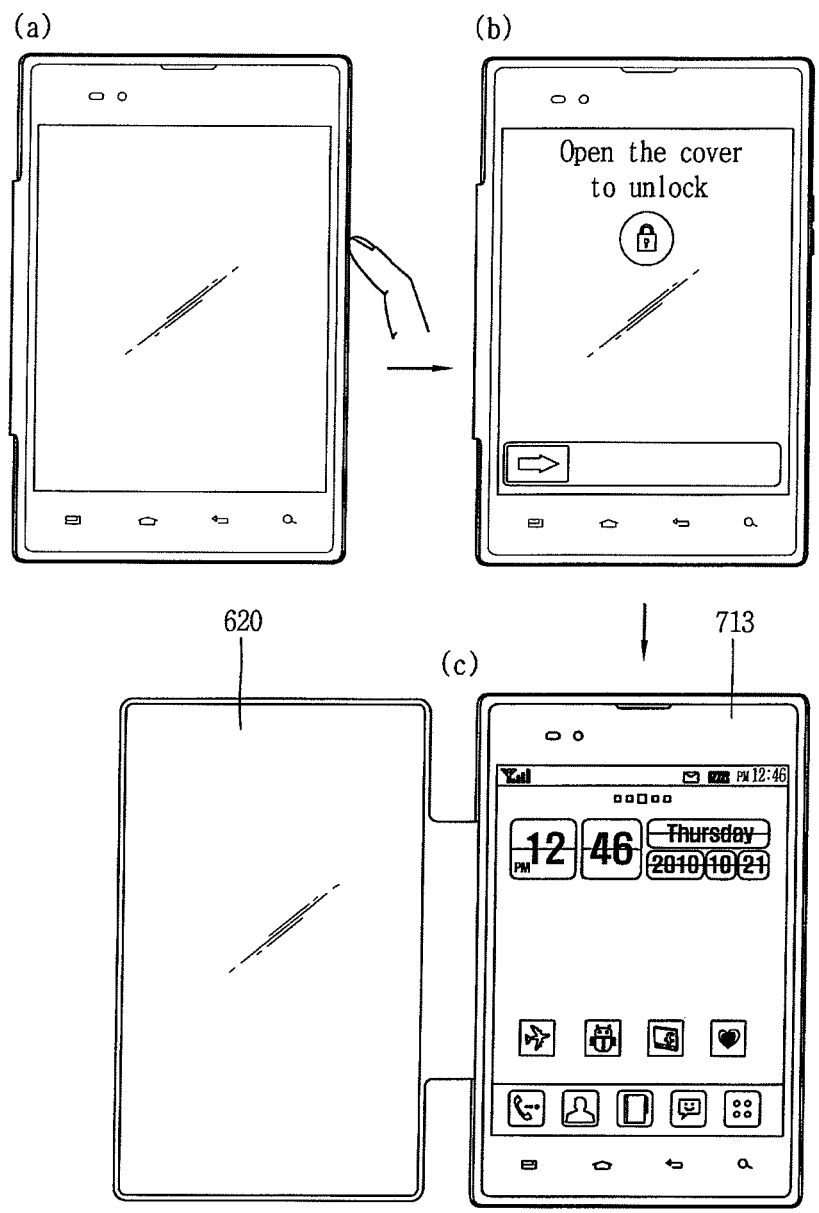
FIGS. 12(a), 12(b) and 12(c) are conceptual views illustrating examples of graphic user interfaces implemented by a portable electronic device according to an embodiment of the present invention.

FIG. 12 is a conceptual view illustrating another example of a graphic user interface implemented by the portable electronic device according to an embodiment of the present invention.

As illustrated, defining of inputting to release a lock mode of the touch screen 713 may be opening and closing of the second part 620.

As illustrated in (a) and (b) of FIG. 12, when a side volume key (push key) is pushed, the portable electronic device is converted from a sleep mode to a lock mode.

When the portable electronic device recognizes that the second part 620 covers the touch screen 713, the controller of the portable electronic device may output an unlock guide in a lock screen. The unlock guide may be, for example, a guide for releasing the locked state by opening the second part.

Referring to (c) of FIG. 12, with the unlock guide output on the lock screen, when the second part is rotated to open, the touch screen 713 enters a home screen. In this case, the user may manipulate the touch screen 713 through the second part 620 to release the locked state or opens the pouch to release the locked state.

Figure 13A:
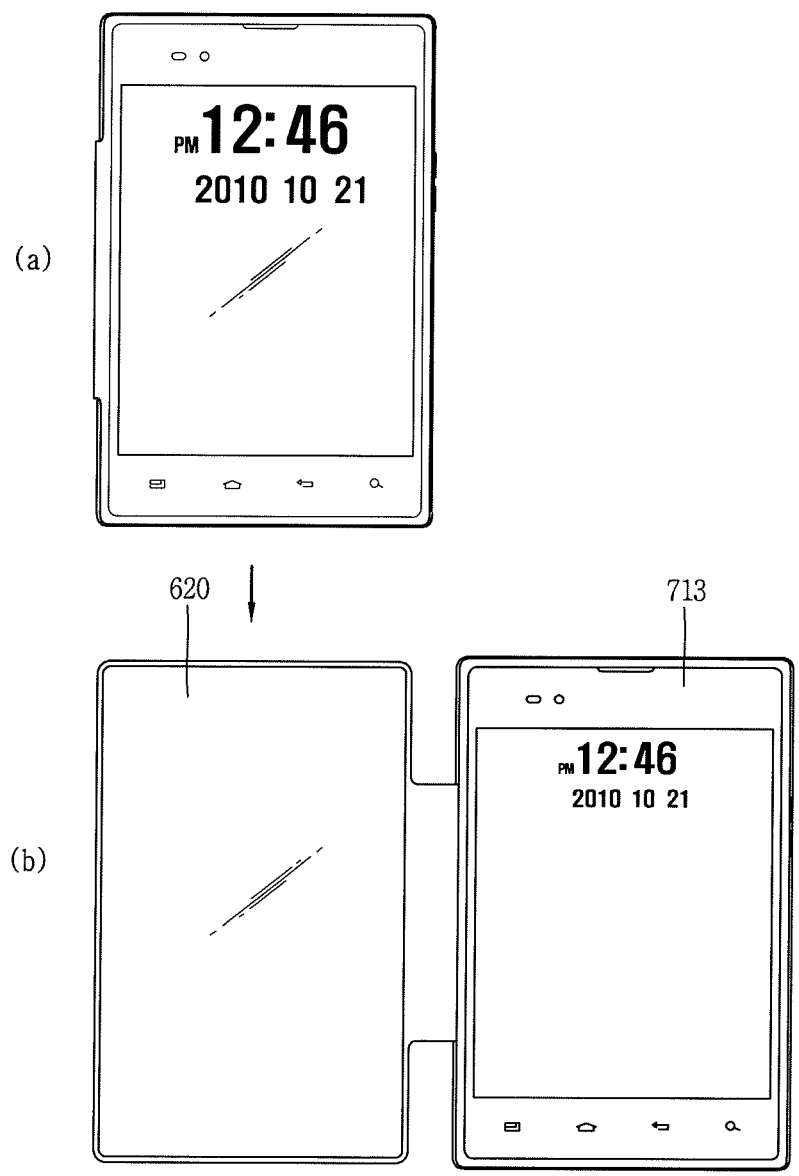
FIGS. 13A(a) and 13A(b) are conceptual views illustrating examples of graphic user interfaces implemented by a portable electronic device according to an embodiment of the present invention.
Figure 13B:
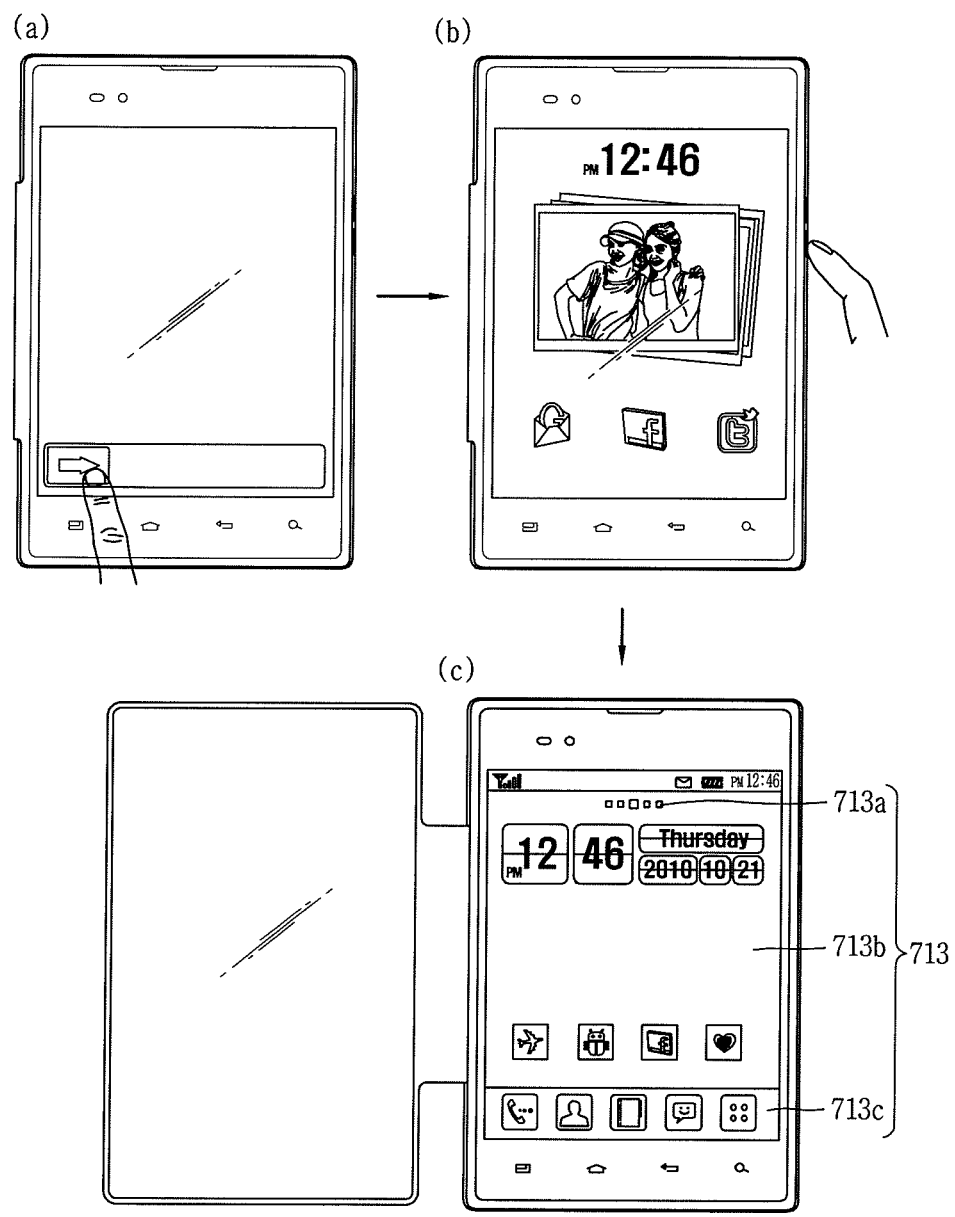
FIGS. 13B(a), 13B(b) and 13B(c) are conceptual views illustrating examples of graphic user interfaces implemented by a portable electronic device according to an embodiment of the present invention.
Figure 13C:
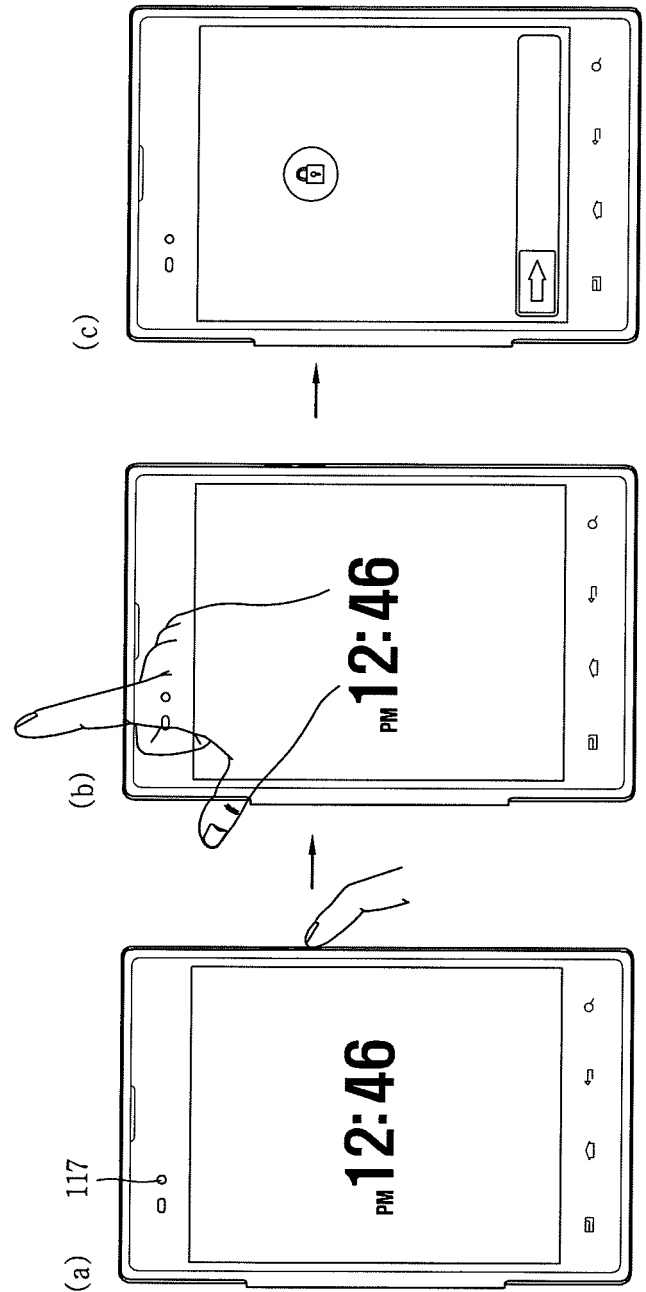
FIGS. 13C(a), 13C(b) and 13C(c) are conceptual views illustrating examples of graphic user interfaces implemented by a portable electronic device according to an embodiment of the present invention.

FIGS. 13A to 13C are conceptual views illustrating another example of a graphic user interface implemented by the portable electronic device according to an embodiment of the present invention.

Referring to FIGS. 13A to 13C, a graphic user interface (GUI) output to the touch screen 713 according to an input of a control command is set to be different according to opening and closing of the touch screen 713 by the second part 620. Namely, the portable electronic device 100 provides a dedicated GUI in the closed state.

FIG. 13A illustrates that the size of output characters or an image is changed. In detail, in the closed state, it is difficult to recognize characters or an image due to the pouch, so the size of the characters or an image is increased. In this case, when the second part 620 is open, output characters or an image are changed according to an original set value. Namely, the size of output characters of an image is restored into a pre-set value.

FIG. 13B illustrates that a layout of a standby screen in the state in which the touch screen is covered is set to be different from a layout of a standby screen in the state in which the touch screen is open.

As shown in (c) of FIG. 13B, the original home screen of the portable electronic device may include an identification information region 713a indicating to which of a plurality of base regions currently output objects correspond to and a base region 713b on which objects may be displayed. In addition, the home screen of the portable electronic device may further include a basic region 713c on which icons corresponding to particular applications previously set by the controller or a user selection are fixedly displayed.

Icons displayed on the basic region 713c may be continuously output to the basic region 713c even when the currently output base region 713b is converted into a different base region.

Referring to (a) and (b) of FIG. 13B, when a lock screen is released, the portable electronic device senses a covered state, and in this case, the portable electronic device outputs a dedicated GUI. The dedicated GUI may be selected from icons disposed on the identification information region 713a, the base region 713b, and the basic region 713c. Namely, icons output in the state in which the touch screen is covered is selected from among icons output in the state in which the touch screen is open.

Disposition of selected icons may be additionally set, and accordingly, the user may output icons mainly used in the closed state to the home screen in the closed state. Examples of the icons may include a clock, a call record, execution of a front camera, characters, execution of SNS, and the like.

Referring to FIG. 13C, a user interface allowing the proximity sensor 117 or an illumination sensor, as well as the pouch, to interwork may be provided. For example, the portable electronic device may be basically set to be converted into a lock mode from a sleep mode when the push key is pressed, but the portable electronic device 100 is operated differently in a closed state.

As shown in (a) of FIG. 13C, when the push key is pressed, a widget or an application, such as a clock, or the like, designated by the user is executed, and in this state, when the proximity sensor 117 senses that the user's finger has approached, the executed screen (clock in this embodiment) of a widget or an application is converted into a lock screen. This user interface can enhance user convenience.

FIG. 14 is a conceptual view illustrating another example of a graphic user interface implemented by the portable electronic device according to an embodiment of the present invention.

In FIG. 14, user interfaces in relation to an operation of converting the second part of the pouch from an open state to a closed state are illustrated. In FIG. 14, a state in which the pouch is open and the touch screen of the portable electronic device is activated is proposed as a basic state.

When the pouch is closed in the basic state, as shown in (a) of FIG. 14, the portable electronic device enters a sleep mode. In this case, when the pouch is open within a pre-set time, the portable electronic device may be restored into the basic state.

In another example, when the pouch is closed in the basic state, as shown in (b) of FIG. 14, the portable electronic device may output an icon I for executing a particular application such as execution of a quick memo. The icon I may be set by the user, and the user may execute a desired application in the state in which the second part is closed.

The output of the basic state, as shown in (b) of FIG. 14, may be modified. For example, when the pouch is closed in the basic state, as shown in (c) of FIG. 14, a residual image with respect to information items which have been output to the home screen in the basic state remains for a certain period of time and the icon I for executing a particular application may be output while the residual image remains.

In this manner, new user interfaces may be implemented as the portable electronic device senses opening and closing of the touch screen.

In an embodiment of the present invention, since the pouch has light-transmittance (or translucency) and conductivity, the pouch can expose visual information to the outside in the state in which the touch screen is covered, and allows for a touch input with respect to the touch screen.

In addition, since the second part of the pouch is made of a rubber material and the first part is made of a material harder than that of the rubber material, the pouch that can firmly protect the portable electronic device, does not slide, and maintains touch sensitivity can be implemented.

Also, the second part of the pouch is formed to have different levels of touch sensitivity by portions, thus providing a hybrid function appropriate for the touch screen and the touch key of the portable electronic device.

In addition, user convenience can be enhanced by the portable electronic device having a graphic user interface in the state in which the pouch is closed.

The pouch and the portable electronic device as described above are not limited to the configurations and methods of the embodiments as described above but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A portable electronic device comprising:
a main body;
a touch screen disposed in the main body, wherein the touch screen is configured to be covered or be uncovered by a front part of a pouch while a rear part of the pouch receives or accommodates the main body; and
a controller configured to:
enter the portable electronic device into a sleep state in which the touch screen is deactivated while the touch screen is covered by at least a portion of the front part of the pouch,
activate the touch screen and display a first graphic user interface on the touch screen when the touch screen is uncovered by the at least the portion of the front part of the pouch, the first graphic user interface including a home screen,
when the at least the portion of the front part of the pouch returns to cover the touch screen, display a second graphic user interface different from the first graphic user interface on a portion of the touch screen related to a transparent portion of the front part of the pouch in response to the returning of the at least the portion of the front part of the pouch, the touch screen remaining activated during the display of the second graphic user interface, the second graphic user interface including at least one specific application icon that is executable based on a user input on the transparent portion of the front part of the pouch, and
execute an application related to the at least one specific application icon based on the user input when the touch screen is covered by the at least the portion of the front part of the pouch.

2. The portable electronic device of claim 1, wherein the transparent portion of the front part of the pouch is made of a rubber material to allow the touch screen to sense a touch input with the transparent portion covering the touch screen.

3. The portable electronic device of claim 1, wherein, when the touch screen is displayed in a state in which the at least the portion of the front part of the pouch covers the touch screen, the controller is further configured to increase a brightness of the touch screen in comparison to a pre-set brightness of the touch screen.

4. The portable electronic device of claim 1, wherein the controller is further configured to:
perform a releasing a lock mode based on whether the touch screen is covered or uncovered by the at least the portion of the front part of the pouch.

5. The portable electronic device of claim 1, wherein the controller is further configured to:

enter a locked state when a user input is not sensed during a pre-set period of time or an input of a special key is received; and display the first graphic user interface including the home screen without converting into a lock screen when the touch screen is uncovered from the at least the portion of the front part of the pouch.

6. The portable electronic device of claim 5, wherein the controller is further configured to:

enter the portable electronic device into a sleep state in which the touch screen is deactivated while the touch screen is covered by the at least the portion of the front part of the pouch, and when the touch screen is uncovered from the at least the portion of the front part of the pouch, activate the touch screen and display the first graphic user interface including the home screen on the touch screen.

7. The portable electronic device of claim 1, wherein the transparent portion of the front part of the pouch includes a mirror film configured to reflect light when the touch screen is deactivated.

8. The portable electronic device of claim 1, wherein the at least one specific application icon is an icon for execution of a camera of the portable electronic device.

9. The portable electronic device of claim 1, wherein a display size of information in the second graphic user interface is different from a display size of the information in the first graphic user interface.

10. The portable electronic device of claim 1, further comprising:

a push key disposed in the main body, wherein the controller is further configured to:

in response to an input by the push key, display a lock screen on the touch screen when the touch screen is uncovered by the at least the portion of the front part of the pouch, or display the second graphic user interface including the at least one specific application icon on the portion of the touch screen when the touch screen is covered by the at least the portion of the front part of the pouch.

11. The portable electronic device of claim 10, wherein the at least one specific application icon is an icon for execution of a camera.

12. The portable electronic device of claim 1, further comprising:

a proximity sensor disposed in the main body, wherein the controller is further configured to:

in response to a sensed input by the proximity sensor, display a third graphic user interface different from the first graphic user interface while the touch screen is covered by the at least the portion of the front part of the pouch.

13. The portable electronic device of claim 1, further comprising:

a sensor disposed in the main body and configured to sense a magnetic field corresponding to a magnet mounted in the front part of the pouch, wherein the controller is further configured to recognize whether the touch screen is covered by the at least the portion of the front part of the pouch using the sensor.

14. The portable electronic device of claim 1, wherein a camera hole is formed at a position of the pouch corresponding to a camera of the portable electronic device.

15. A method of controlling a portable electronic device, the method comprising:

entering, via a controller, the portable electronic device into a sleep state in which a touch screen of the device is deactivated while the touch screen is covered by at least a portion of a front part of a pouch, wherein the touch screen is configured to be covered or be uncovered by the front part of the pouch while a rear part of the pouch receives or accommodates a main body;

activating, via the controller, the touch screen and displaying a first graphic user interface on the touch screen when the touch screen is uncovered by the at least the portion of the front part of the pouch, the first graphic user interface including a home screen, when the at least the portion of a front part of a pouch returns to cover the touch screen, displaying a second graphic user interface different from the first graphic user interface on a portion of a touch screen of the portable electronic device in response to the returning of the at least the portion of the front part of the pouch, wherein the portion of the touch screen is related to a transparent portion of the front part of the pouch, the touch screen remaining activated during the displaying of the second graphic user interface, and wherein the second graphic user interface includes at least one specific application icon that is executable based on a user input on the transparent portion of the front part of the pouch; and executing an application related to the at least one specific application icon based on the user input when the touch screen is covered by the at least the portion of the front part of the pouch.

16. The method of claim 15, wherein the transparent portion of the front part of the pouch is made of a rubber material to allow the touch screen to sense a touch input with the transparent portion covering the touch screen.

17. The method of claim 15, further comprising:

increasing, via the controller of the portable electronic device, a brightness of the touch screen in comparison to a pre-set brightness of the touch screen, when the touch screen is displayed in a state in which the at least the portion of the front part of the pouch covers the touch screen.

18. The method of claim 15, further comprising:

performing, via the controller of the portable electronic device, a releasing of a lock mode based on whether the touch screen is covered or uncovered by the at least the portion of the front part of the pouch.

19. The method of claim 15, further comprising:

entering a locked state when a user input is not sensed during a pre-set period of time or an input of a special key is received; and displaying the first graphic user interface including the home screen without converting into a lock screen when the touch screen is uncovered from the at least the portion of the front part of the pouch.

20. The method of claim 19, further comprising:

entering the portable electronic device into a sleep state in which the touch screen is deactivated while the touch screen is covered by the at least the portion of the front part of the pouch; and when the touch screen is uncovered from the at least the portion of the front part of the pouch, activating the touch screen and displaying the first graphic user interface including the home screen on the touch screen.

21. The method of claim 15, wherein the transparent portion of the front part of the pouch includes a mirror film configured to reflect light when the touch screen is deactivated.

22. The method of claim 15, wherein the at least one specific application icon is an icon for execution of a camera of the portable electronic device.

23. The method of claim 15, further comprising:
in response to an input by a push key disposed in the main body, displaying a lock screen on the touch screen when the touch screen is uncovered by the at least the portion of the front part of the pouch, or displaying the second graphic user interface including the at least one specific application icon on the portion of the touch screen when the touch screen is covered by the at least the portion of the front part of the pouch.

24. The method of claim 23, wherein the at least one specific application icon is an icon for execution of a camera of the portable electronic device.

25. The method of claim 15, further comprising:
in response to a sensed input by a proximity sensor disposed in the main body, displaying a third graphic user interface different from the first graphic user interface while the touch screen is covered by the at least the portion of the front part of the pouch.

26. The method of claim 15, further comprising:
recognizing whether the touch screen is covered by the at least the portion of the front part of the pouch using a sensor disposed in the main body configured to sense a magnetic field corresponding to a magnet mounted in the front part of the pouch.

27. The method of claim 15, wherein a camera hole is formed at a position of the pouch corresponding to a camera of the portable electronic device.

\* \* \* \* \*